United States Patent [19]

Nakaiwa et al.

[11] Patent Number: 4,770,459
[45] Date of Patent: Sep. 13, 1988

[54] LOCK ASSEMBLY FOR PIVOTAL VEHICLE SEAT

[75] Inventors: Mikio Nakaiwa, Osaka; Saburo Suzuki, Kariya, both of Japan

[73] Assignees: Daihatsu Motor Co., Ltd., Osaka; Aisin Seiki Co., Ltd., Aichi, both of Japan

[21] Appl. No.: 85,201

[22] Filed: Aug. 14, 1987

[30] Foreign Application Priority Data

Aug. 18, 1986 [JP] Japan .......................... 61-125950[U]

[51] Int. Cl.⁴ .......................... B60N 1/04; B60R 22/26
[52] U.S. Cl. ............................... 296/65 R; 296/65 A; 296/188; 297/336; 280/801; 248/503.1
[58] Field of Search .................... 296/65 R, 65 A, 188; 297/331, 336, 379, 468; 280/801; 248/503.1

[56] References Cited

U.S. PATENT DOCUMENTS

| | | | |
|---|---|---|---|
| 4,072,347 | 2/1978 | Boisset | 297/468 |
| 4,218,074 | 8/1980 | Crawford | 280/801 |
| 4,268,086 | 5/1981 | Okuyama | 297/63 |
| 4,475,769 | 10/1984 | Crawford et al. | 297/331 |
| 4,627,656 | 12/1986 | Gokimoto et al. | 296/65 R |

FOREIGN PATENT DOCUMENTS 3039391  7/1981  Fed. Rep. of Germany .
59-51628  4/1984  Japan .
61-12836  1/1986  Japan .

Primary Examiner—Dennis H. Pedder
Attorney, Agent, or Firm—Birch, Stewart, Kolasch & Birch

[57] ABSTRACT

A lock assembly for a pivotal automobile seat comprising a seat belt anchor plate fixed to the seat and having an upwardly directed engaging lip, a pair of base plates joined together to define an accommodating space and fixed to the anchor plate by a pair of bolts, and a locking mechanism housed within the accommodating space of the base plates for releasably locking to a support member on the vehicle floor, wherein a reinforcing plate is welded to one of the base plates which is closer to the anchor plate, and the reinforcing plate has a downwardly directed engaging projection for engagement with the engaging lip of the anchor plate upon slight deformation of the anchor plate.

12 Claims, 5 Drawing Sheets

LOCK ASSEMBLY FOR PIVOTAL VEHICLE SEAT

BACKGROUND OF THE INVENTION

1. Field of the Invention

This invention relates to a lock assembly for a pivotal vehicle seat, and more particularly to a lock assembly for releasably locking to an automobile floor a rear seat which, when released and folded, is pivotable forwardly upward to a substantially upright position immediately behind a front seat or seats for space saving accommodation.

2. Description of the Prior Art

In recent years, particular types of automobiles, such as vans and coaches, are becoming increasingly popular because they provide a large riding space as well as a large cargo space. In these cars, the rear seat, usually bench type, is designed to be pivotally foldable behind the front seat or seats, so that a maximum cargo space is obtained when desired. Thus, it is necessary to provide a lock mechanism or mechanisms which can releasably connect the rear seat to the automobile floor.

Japanese Utility Model Application Laid-open No. 59-51628 (Laid-open: April 5, 1984; Application No.: 57-148085; Filed: Sept. 30, 1982; Applicant: TOYOTA MOTOR CORP. et al; Inventor: Hiroichi YOSHIKAWA et al) discloses a lock assembly for a forwardly pivotable automobile seat. More specifically, the lock assembly comprises a pair of base plates joined together to define an accommodating space which houses a locking mechanism. The joined base plates are fixed to the seat cushion at each side thereof. The locking mechanism includes a latch which automatically engages a striker rod on the automobile floor when the seat cushion is pivotally brought to its substantially horizontal position of use. The locking mechanism further includes a lever which is actuated to forcibly disengage the latch from the striker rod.

The prior art lock assembly has no special means for reinforcing the base plates and is not intended to withstand a large tensile force which may be applied for example at the time of an automobile collision. In other words, the base plates may deform when a large tensile force is applied thereto. Such deformation of the base plates can cause positional deviations of the movable parts (latch and lever) housed within the accommodating space of the base plates, inviting subsequent malfunction of the movable parts.

The above problem of the prior art lock assembly becomes more serious in the case of a three-passenger bench seat which provides a seat belt safety system for all of the three passengers (instead of only two), because the tensile force applied to the lock assembly at the time of an automobile collision is extremely large.

SUMMARY OF THE INVENTION

It is, therefore, an object of the present invention to provide a seat lock assembly which is capable of withstanding a large tensile force, thereby ensuring an increased safety.

Another object of the invention is to provide a seat lock assembly which can serve as an anchor for two seat belts.

A further object of the invention is to provide a seat lock assembly in which the connection between a seat belt anchor plate and a lock mechanism becomes stronger upon slight deformation of the anchor plate.

According to the invention, there is provided a lock assembly for a pivotal vehicle seat comprising a seat belt anchor plate fixed to the seat and having an upwardly directed engaging lip, base plate means fixed to the anchor plate by fixing means and having a side surface facing the anchor plate, locking means mounted to the base plate means for releasably locking to a support member on the vehicle floor, and a reinforcing plate fixed to the side surface of the base plate means and having a downwardly directed engaging projection, wherein the engaging lip being introduced into a gap between the engaging projection and the side surface.

With the construction described above, the base plate means, which is more sensitive to deformation than the anchor plate, is rendered strong by the reinforcing plate. Further, the engaging projection of the reinforcing plate comes into engagement with the engaging lip of the anchor plate to back up the fixing means in withstanding a large tensile force which may arise upon an automobile collision.

Preferably, the engaging lip of the anchor plate is slightly spaced from the engaging projection of the base plate means but comes into engagement therewith upon slight deformation of the anchor plate. According to this arrangement, a small tensile force applied to the anchor plate is normally born by the fixing means only, whereas a large tensile force is reliably born by the fixing means as well as by the engaging projection and the engaging lip after the shock of an automobile collision is absorbed to a certain extent by the deformation of the anchor plate.

In a further advantageous arrangement, the fixing means comprises a horizontally spaced bolts, and the engaging projection of the base plate means together with the engaging lip of the anchor plate is positioned substantially in the center between the two bolts. Such arrangement ensures that a large tensile force is transmitted in a well dispersed and proportioned manner without unacceptable deformation and stress concentration at the connection between the anchor plate and the base plate means.

Other objects, features and advantages of the present invention will become apparent from the following detailed description given with reference to the accompanying drawings.

DETAILED DESCRIPTION

Figure 1:
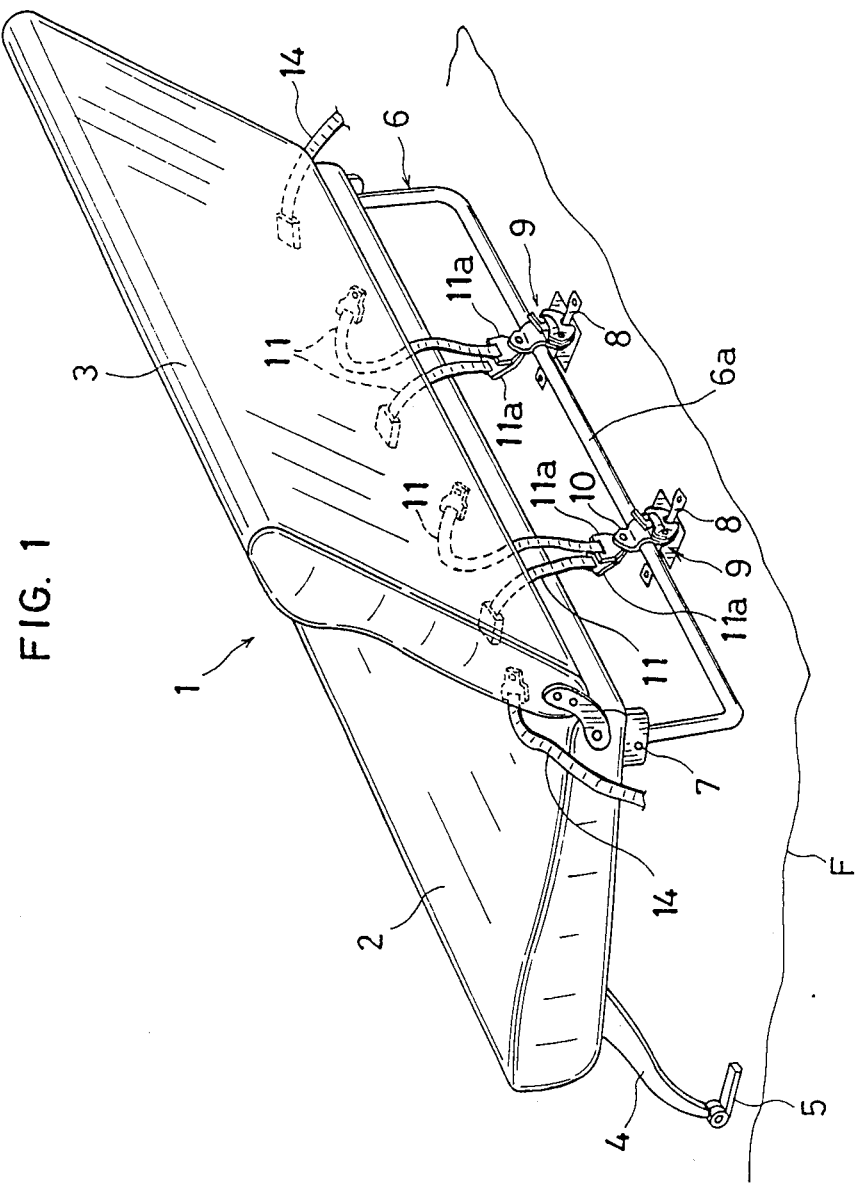
FIG. 1 is a perspective view of an automobile rear seat incorporating a lock assembly according to the invention.

The present invention is advantageously applicable to a foldable automobile rear seat of the leg support type such as illustrated in FIG. 1. However, the invention is also applicable to any vehicle seat, legged or non-legged, which is pivotable between a normal position of use and a position of non-use.

Referring now to FIG. 1, an automobile rear seat generally represented by reference numeral 1 comprises a seat cushion 2 and a pivotal seat back 3, as is well known. A pair of front legs 4 (only one shown) are fixed to the underside of the cushion 2 but have their respective lower ends pivotally connected to the automobile floor F by means of hinges 5 (only one shown). The cushion 2 further has a generally U-shaped rear leg 6 pivotally connected to the underside of the cushion by means of pins 7. A lower intermediate web portion 6a of the rear leg 6 is releasably lockable to striker rods 8 by means of a pair of laterally spaced lock mechanisms 9 fixed to respective seat belt anchor plates 10, as hereinafter described in detail.

Each anchor plate 10 serves as an anchor for a pair of inner seat belts 11. More specifically, each inner seat belt 11 has an end plate 11a connected to an upper portion of the anchor plate by a bolt 12 and a nut 13 (see FIG. 5), and extends therefrom for detachable connection to an outer seat belt 14 extending from an automobile side wall (not shown) or to another inner seat belt 11 extending from the other anchor plate 10.

In FIG. 1, the seat 1 is shown to be in its position of use. When desired, each lock mechanism 9 may be unlocked to disengage from a corresponding striker rod 8. In this unlocked state, the rear leg 6 is pivoted onto the underside of the seat cushion 2 with the seat back 3 also pivotally folded onto the cushion 2. The thus folded seat 1 is then pivoted upward to a substantially upright position immediately behind a front seat or seats (not shown) to be accommodated in a space saving fashion.

As illustrated in detail in FIGS. 2 to 5, each lock mechanism 9 comprises a first and a second base plates 15, 16 joined together and so shaped as to define an accommodating space 17 therebetween. Each base plate is generally in the form of an inverted triangle in front or rear view and has a downwardly flaring cutout 18 for guiding the striker rod 8 thereinto.

The lock mechanism 9 further includes a latch 19 and a lever 20, both pivotally mounted within the accommodating space 17 of the base plates 15, 16 by means of respective pins 21, 22 arranged on both sides of each cutout 18. The latch 19 and the lever 20 are always urged toward each other by a coil spring 23 connected to both of them.

The latch 19 has a hook portion 19a and an abutting portion 19b opposed to the hook portion 19a to define therebetween a catch recess 19c for releasable engagement with the striker rod 8. The latch further has a stopper recess 19d followed by a generally arcuate edge 19e.

The lever 20 has an extended handle portion 20a for manual operation. The lever also has a stopper projection 20b for releasable engagement with the stopper recess 19d of the latch 19.

Figure 4:
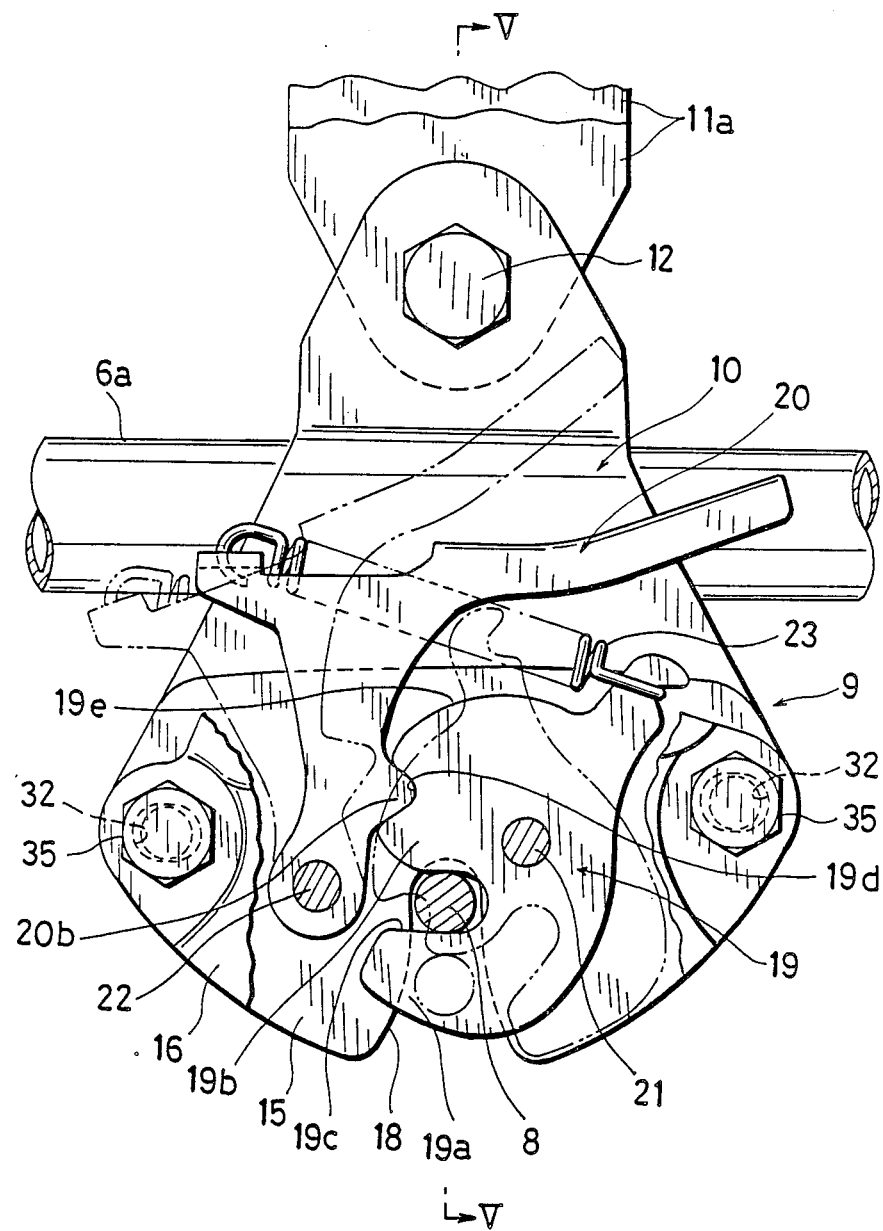
FIG. 4 is a rear elevational view, partly broken away, illustrating movable parts of the lock mechanism.

When the latch 19 and the lever 20 assume their respective locking position indicated in solid lines in FIG. 4, the stopper projection 20b of the lever 20 engages with the stopper recess 19d of the latch 19 to prevent the latch from pivoting in an unlocking direction (counterclockwise in FIG. 4). As a result, the latch 19 maintains its engagement with the striker rod 8 even if each inner seat belt 11 (FIG. 1) is subjected to a tension, thereby reliably anchoring the seat 1 on the automobile floor F.

To enable pivotally upward movement of the seat 1 (FIG. 1), the lever 20 is pivoted counterclockwise to its release position indicated in phantom lines in FIG. 4, causing the stopper projection 20a of the lever to disengage from the stopper recess 19d of the latch 19 with the spring 23 tensioned. This results in that the latch 19 automatically pivots counterclockwise by the restoring force of the spring 23 to assume its release position indicated in phantom lines.

In the thus unlocked condition, the abutting portion 19b of the latch 19 is located at the flaring cutout 18 of each base plate, as shown in FIG. 4. Thus, when the striker rod 8 enters into the flaring cutout 18 by pivotally downward movement of the seat 1, the striker rod 8 comes into abutment with the abutting portion 19b of the latch 19. As a result, the latch 19 is forcibly pivoted clockwise in FIG. 4 to resume its locking position, while the stopper projection 20b of the lever 20 moves along the arcuate edge 19e of the latch 19 under the urging force of the spring 23 to snap into the latch stopper recess 19d. In other words, the lock mechanism 9 can be automatically brought into its locking state simply by downward pivotal movement of the seat 1.

Figure 2:
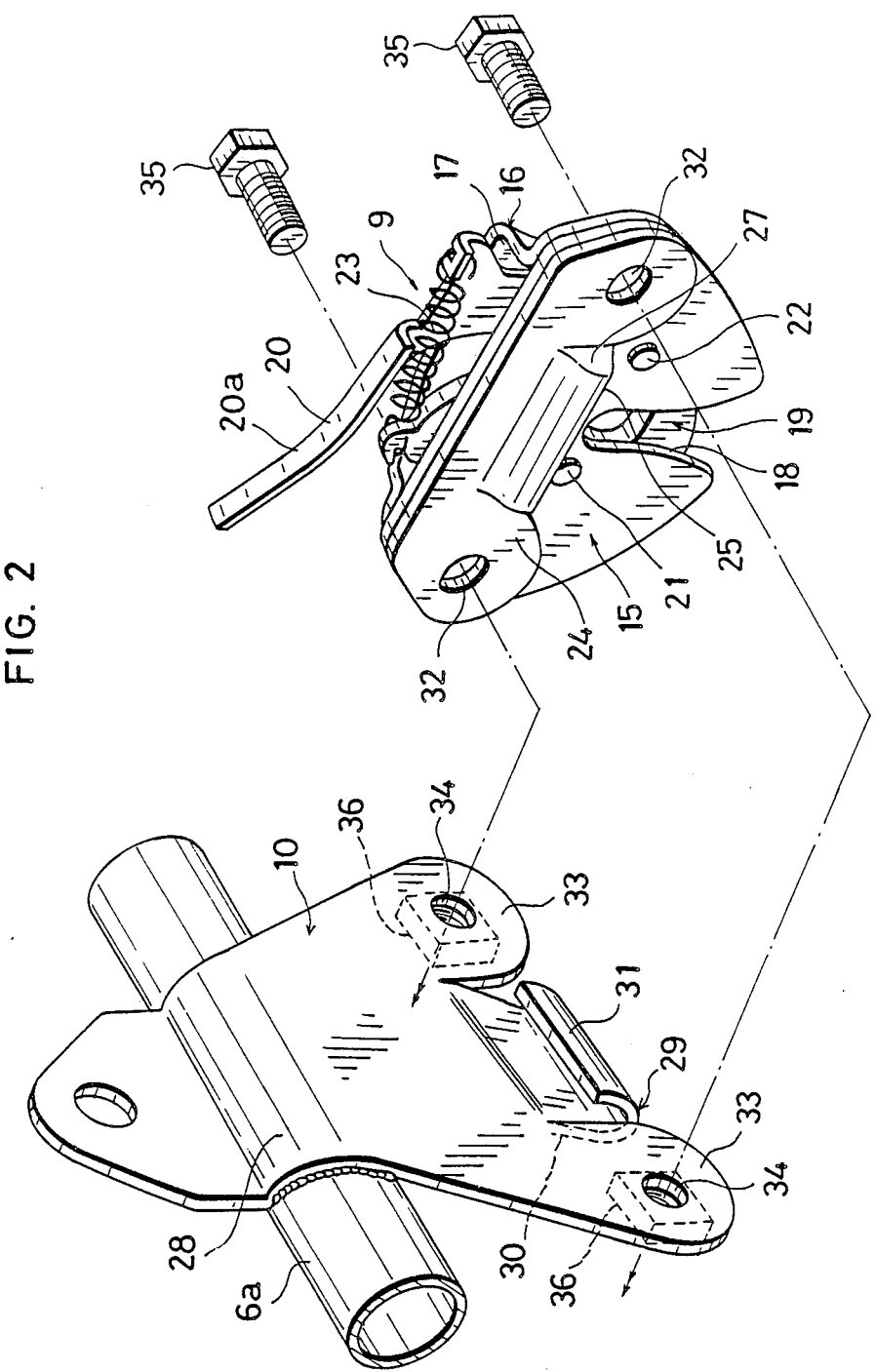
FIG. 2 is an enlarged perspective view showing a lock mechanism prior to its assembly to a seat belt anchor plate.
Figure 3:
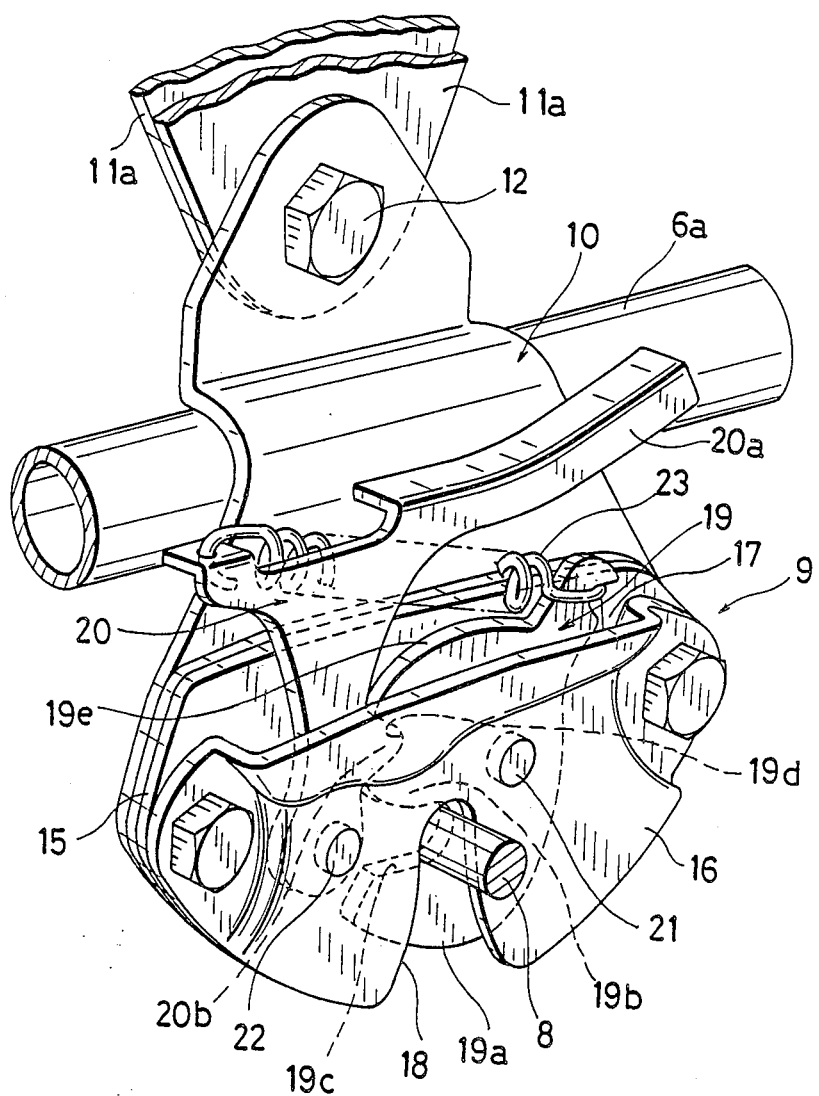
FIG. 3 is a perspective view illustrating the lock mechanism of FIG. 2 as mounted to the anchor plate.
Figure 5:
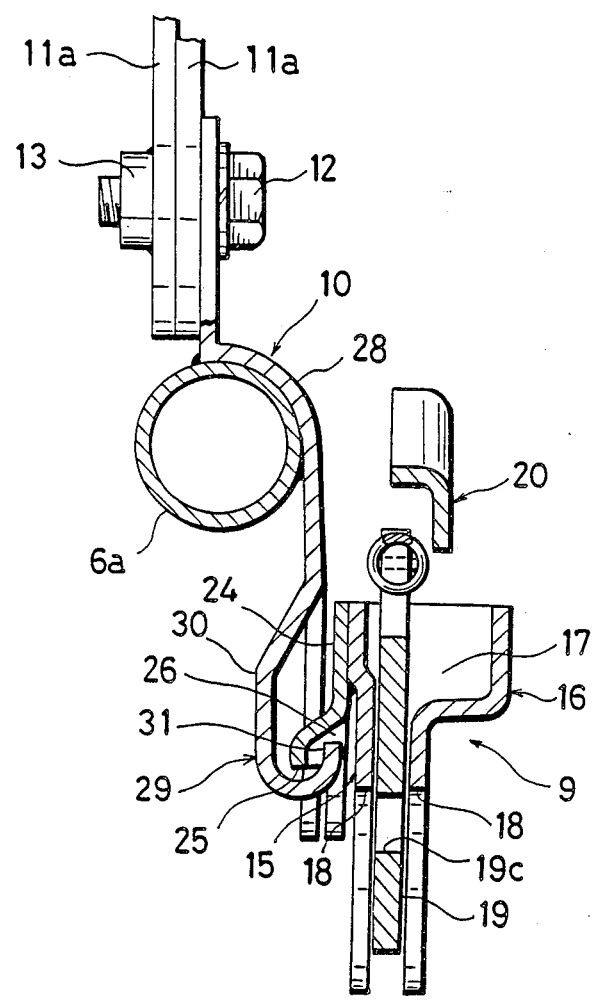
FIG. 5 is a sectional view taken along lines V—V in FIG. 4.

According to the present invention, the first base plate 15 is reinforced by a reinforcing plate 24, as illustrated in FIGS. 2 and 5. More specifically, the reinforcing plate 24, which is elongated and extends substantially horizontally, is firmly welded to an upper portion of the first base plate 15 on one side thereof facing the seat belt anchor plate 10. The reinforcing plate 24 is formed with a downwardly directed integral engaging projection 25 which extends longitudinally along the lower marginal edge of the reinforcing plate centrally thereof, thereby defining a gap 26 between the engaging projection 25 and the first base plate 15. The engaging projection 25 is provided at each end thereof with an integral side wall 27. Thus, the engaging projection 25 has an increased modulus of elasticity and provides high resistance against deformation.

On the other hand, the seat belt anchor plate 10 has an arcuate intermediate portion 28 fixedly welded to the connecting web portion 6a of the rear leg and flares downward in a vertical plane to provide the general appearance of a triangle. The triangular anchor plate 10 has an integral U-shaped wall 29 which extends substantially horizontally along the lower marginal edge of the anchor plate centrally thereof. The U-shaped wall 29 has a rear wall portion 30 receded slightly behind the vertical plane of the anchor plate 10 and an upwardly directed front wall portion 31 located slightly ahead of the vertical plane. The front wall portion 31 serves as an engaging lip which is introduced into the gap 26 between the first base plate 15 and the engaging projection 25 of the reinforcing plate 24 with a slight spacing from the engaging projection 25.

The laminated assembly of the two base plates 15, 16 and the reinforcing plate 24 has a pair of through-holes 32 positioned on both sides of the engaging projection 25 of the reinforcing plate 24. The anchor plate 10 has a pair of lower side ears 33 respectively formed with through-holes 34 on both sides of the U-shaped wall 29 in corresponding relation to the through-holes 32 of the laminated assembly. Thus, the laminated assembly or lock mechanism 9 can be fixed to the anchor plate 10 by a pair of bolts 35 inserted into the through-holes 32, 34 to be screwed into a corresponding pair of nuts 36 behind the anchor plate 10.

With the construction described above, the reinforcing plate 24 has the following two functions.

Firstly, the reinforcing plate 24, which itself is mechanically strong, prevents or drastically reduces deformation of the two base plates 15, 16 because the reinforcing plate 24 is integrated with the base plates 15, 16 into a single laminated structure. This function is significant in that the movable parts (i.e. latch 19 and lever 20) housed in the accommodating space 17 of the base plates 15, 16 becomes less liable to malfunction which may result from positional deviations due to deformation of the base plates. Further, the reinforcing plate 24 prevents the base plates 15, 16 from breaking at the respective cutouts 18 which are mechanically weakest locations.

Secondly, the engaging projection 25 of the reinforcing plate 24 comes into engagement with the engaging lip 31 of the anchor plate 10 when an excessive upward pull is applied to the anchor plate 10 with attendant deformation thereof due for example to an automobile collision. As a result, the excessive pulling force is reliably born at three locations (two bolts 35 and engaging lip 31) in a well dispersed and proportioned manner to prevent the seat 1 from pivoting out of its normal position of use. Further, such dispersed manner of load bearing at the time of emergency also restricts deformation and stress concentration of the base plates 15, 16.

It should be pointed out that initial slight deformation of the anchor plate 10, particular the ears 33, is preferable for shock absorption upon an automobile collision, while excessive deformation of the anchor plate can be prevented by subsequent engagement of the engaging lip 31 with the engaging projection 25, as described above.

As illustrated in FIGS. 2 and 4, the through-holes 32 of the laminated assembly 9 are horizontally elongated. This arrangement ensures that initial deformation of the anchor plate 10 does not result in deformation of the base plates 15, 16 housing the movable parts 19, 20.

According to the present invention, since the tensile strength at the connection between the anchor plate 10 and the lock mechanism 9 is extremely increased, the anchor plate 10 may be connected to two seat belts without reduction in safety of the automobile.

The invention being thus described, it is obvious that the same may be varied in many ways. For instance, each anchor plate 10 may be used solely as an anchor for the seat rear leg 6, while separate seat belt anchors may be provided at other suitable locations on the rear leg connecting web portion 6a. Further, the anchor plate 10 may be fixed directly on a frame (not shown) of the seat cushion 2 in case the seat 1 is of the non-legged type. Such variations are not to be regarded as a departure from the spirit and scope of the invention, and all such modifications as would be obvious to those skilled in the art are intended to be included in the following claims.

We claim:

1. A lock assembly for a pivotal vehicle seat comprising:
    a seat belt anchor plate fixed at a portion thereof to said seat and having an upwardly directed engaging lip;
    base plate means fixed to said anchor plate at another portion thereby by fixing means and having a side surface facing said anchor plate;
    locking means mounted to said base plate means for releasably locking to a support member on the vehicle floor;
    a reinforcing plate fixed to said side surface of said base plate means and having a downwardly directed engaging projection, and
    said engaging lip being introduced into a gap between said engaging projection and said side surface.

2. The lock assembly as defined in claim 1, wherein said engaging lip is slightly spaced from said engaging projection but engageable therewith upon deformation of said anchor plate.

3. The lock assembly as defined in claim 1, wherein said reinforcing plate is fixed to said side surface by welding.

4. The lock assembly as defined in claim 1, wherein said reinforcing plate is elongated and fixed substantially horizontally to said side surface at an upper portion of said base plate means, and
    said engaging projection is integral with said reinforcing plate and extends longitudinally of said reinforcing plate along a lower marginal portion thereof.

5. The lock assembly as defined in claim 4, wherein said engaging projection has each end formed with an integral side wall.

6. The lock assembly as defined in claim 5, wherein said engaging lip extends substantially horizontally at a lower portion of said anchor plate and is slightly smaller in length than said engaging projection.

7. The lock assembly as defined in claim 6, wherein said anchor plate has an integral U-shaped wall including a front wall portion and a rear base wall portion, and
    said engaging lip is provided by said front wall portion of said U-shaped wall.

8. The lock assembly as defined in claim 7, wherein said rear wall portion of said U-shaped wall is receded behind a vertical plane containing said anchor plate, and
    said front wall portion of said U-shaped portion is located before said vertical plane.

9. The lock assembly as defined in claim 1, wherein said fixing means comprises a pair of bolts each penetrating through said base plate means, said reinforcing plate, and said anchor plate to be to be screwed into a nut.

10. The lock assembly as defined in claim 9, wherein said pair of bolts are horizontally spaced with said engaging lip and said engaging projection positioned substantially in the center between said bolts.

11. The lock assembly as defined claim 1, wherein said base plate means comprises a pair of base plates designed to define an housing space therebetween for accommodating said locking means, and
    each of said base plates is formed at a lower portion thereof with a downwardly flaring cutout to allow entry thereinto of said support member for releasable engagement with said locking means.

12. The lock assembly as defined in claim 11, wherein said support member is in the form of a horizontal striker rod, and
    said locking means comprises a pivotal latch having a catch recess for engagement with said striker rod in said cutout of each base plate, a pivotal lever engageable with said latch to keep it in engagement with said striker rod, and a spring which acts to keep said lever in engagement with said latch but which serves to pivot said latch out of engagement with said striker rod when said lever is forcibly pivoted out of engagement with said latch.

* * * * *